Jan. 26, 1971     K. O. NEUMANN     3,558,157
FOLDABLE TROLLEY
Filed March 18, 1969
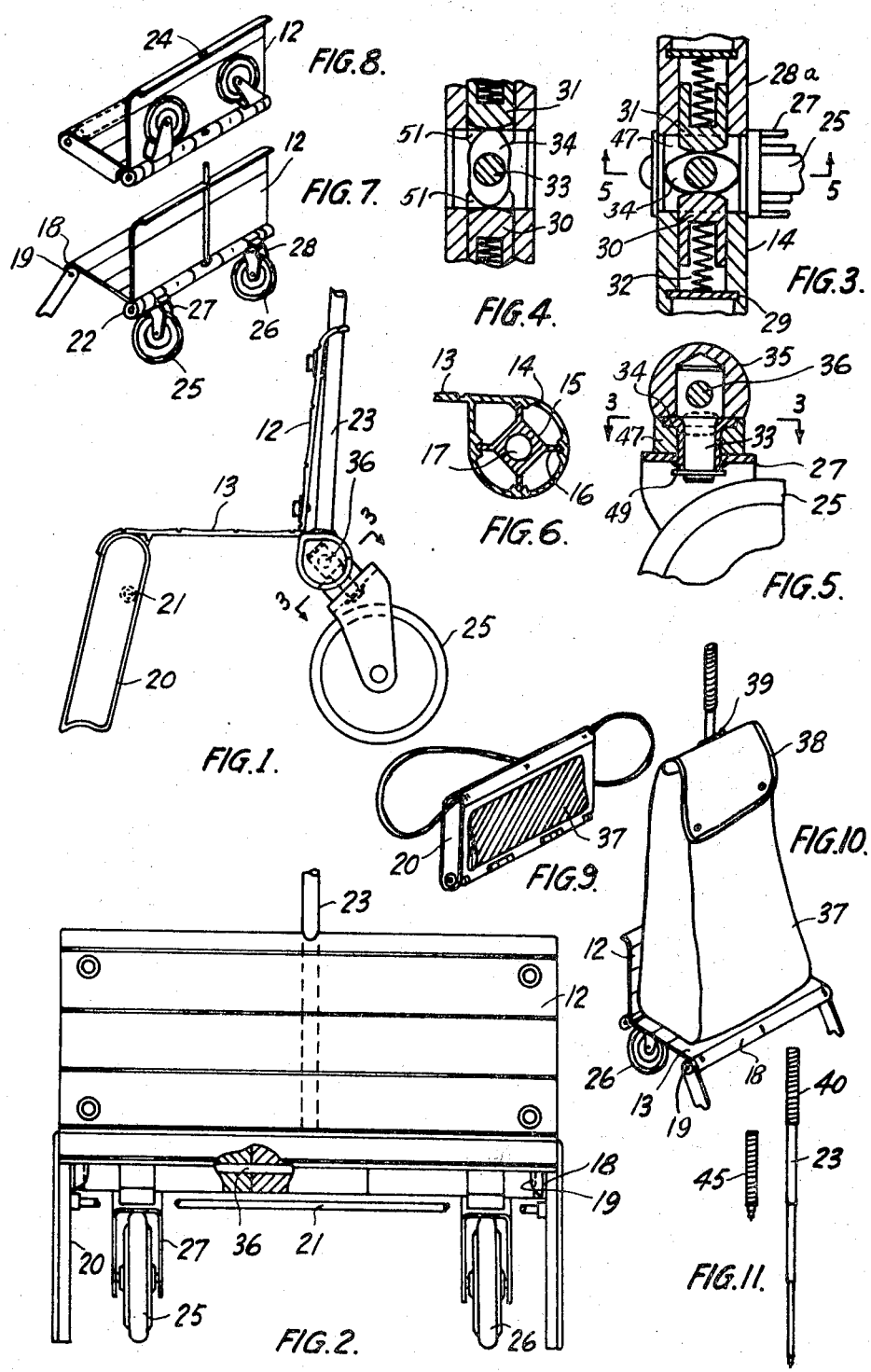
Inventor
K.O.B. Neumann
By Holcombe, Wetherill & Brisebois
Attorneys

# United States Patent Office 3,558,157
Patented Jan. 26, 1971

3,558,157
FOLDABLE TROLLEY
Kurt Otto Bernhard Neumann, 2/7 Grafton Crescent,
Dee Why, New South Wales, Australia
Filed Mar. 18, 1969, Ser. No. 808,165
Int. Cl. B62b 11/00
U.S. Cl. 280—36                                      3 Claims

ABSTRACT OF THE DISCLOSURE

A foldable trolley having two hinge members which are locked in their operating or load carrying position upon part rotation of wheel mounting brackets carrying wheels for supporting the trolley. The hinge members are shaped so that in the folded position they form a space for a handle member.

SUMMARY OF THE INVENTION

This invention relates to a foldable trolley which is particularly useful for supermarket shopping.

It is known to provide a shopping trolley having a flexible bag supported on a wheeled frame including a handle for pushing or pulling the trolley. This type of construction is cumbersome to transport to a shopping locality and the purpose of this invention is to provide a compact foldable trolley which may be carried over the shoulder like a ladies shoulder bag.

The present invention provides a foldable trolley having two hinge members which are hinged together by a retaining pin passing through complementary parts of each hinge member, a pair of wheels mounted on brackets, each bracket having a pivot pin with a cam secured thereto, said pivot pin being journaled in a pivot block positioned between adjacent parts of each hinge member, plunger members positioned in the bores of the said adjacent parts of each hinge member and spring biased to enter cooperating parts of the pivot block, said cam member being shaped so that upon part rotation of the associated bracket it displaces said plungers away from the pivot block into the bore of the hinge members to permit the hinge members to move with respect to each other.

The invention is hereinafter described with reference to the accompanying drawings in which:

FIG. 1, is a side elevation of the base portion of the trolley of this invention, FIG. 2, is a rear elevation of the trolley of FIG. 1.

FIG. 3, is a partial cross section of the wheel mounting in working position and along the line 3—3 of FIGS. 1 and 5, FIG. 4, is a similar view of the arrangement of FIG. 3 but with wheels in the folded position, FIG. 5, is a cross sectional view along the line 5—5 of FIG. 3.

FIG. 6 is a cross sectional view of one of the hinge members of the base,

FIG. 7, is a perspective view of the base erected,

FIG. 8, is a perspective view of the base partly folded,

FIG. 9, is a perspective view of the base and carrier bag in the folded and carrying position, FIG. 10, is a perspective view of the trolley erected with the carrier bag in position, and FIG. 11, is a elevation of the handle in the closed and open positions.

The trolley base is formed of two similar hinged members 12 and 13 in the form of aluminium or plastic extrusions, which are hinged at the hinge part 14. This hinge part, which comprises parts of both the hinge member 12 and the hinge member 13, is cut away in complementary longitudinal positions to form interengaging portions. The bores of the hinge part has bosses 15 with radial flanges 16 and a bore 17. In FIG. 6 only one boss of the hinge part 14, which is part of the hinge member 13 is shown, while no boss is shown in FIG. 1 in order to make this figure more clear. The ends of the hinge member 13 have loops 18 in which mounting bosses 19 of protected leg members 20 locate (FIGS. 7 and 10). The leg memebrs are tied together by means of a cross bar 21 (FIGS. 1 and 2). The ends of the hinge part are covered by caps 22. A handle 23 is secured to the hinge member 13 and it passes through an aperture 24 in the hinge member 12.

Wheels 25, 26 are mounted on inverted U brackets 27, 28 which are positioned at spaced points along the hinge part 14. Spring backing members 29 are positioned in the hinge part 14 and opposed plungers 30 and 31 with biasing spring 32 are displaceable by a pivot pin 33 and a cam 34, being the flanged edge of a sleeve (FIG. 5) welded to the upper part of the inverted U brackets 27 and 28, respectively. Said sleeve is surrounded by a spacer sleeve 47 and mounted on the pivot pin 33 by a snap ring 49. The assembly for each bracket 27, 28 is mounted on a pivot block 35 positioned between cooperating hinge sections 14 and 28a. A retaining pin 36 passes through the aperture 17 of the hinge members 14 and 28a, as well as a recess in the mounting block 35. Therefore, the brackets 27 and 28 are rotatable about the retaining pin 36 as well as the pivot pin 33, when the cam 34 is in the position of FIG. 4.

A bag 37 of flexible material with lid 38 and mounting pin is secured to the trolley by any convenient means.

The handle 23 has a hand grip 40 and the position of such handle when telescoped is indicated at 45. When the handle is stored in the folded trolley it locates between the leg mounting bosses 19.

When the wheels are in the position shown in FIGS. 4 and 8 the hinged members 12 and 13 may be moved with respect to each other. When the inverted U-shaped brackets are moved to the position shown in FIG. 3 the plungers 30 and 31 extend into recesses 51 in the spacer sleeve 47 and corresponding recesses (indicated in FIG. 5 in broken lines) in the enlarged, upper part of the pivot pin 33 and lock the adjacent hinge parts 14 and 28a together thereby preventing further movement of the hinge parts.

What is claimed is:

1. A foldable trolley having two hinge members which are hinged together by a retaining pin passing through complementary parts of each hinge member. a pair of wheels mounted on brackets, each bracket having a pivot pin with a cam secured thereto, said pivot pins being journaled in a pair of pivot blocks positioned in spaced relation between adjacent parts of each hinge member, plunger members engageable with said cam and positioned in the bore of the said adjacent parts of each hinge member and spring biased to enter cooperating parts of the pivot blocks for preventing relative movement of said hinge members, said cam being shaped so that upon part rotation of the associated bracket it displaces said plungers away from the pivot block into the bore of the hinge members to permit the hinge members to move with respect to each other.

2. A foldable trolley as claimed in claim 1, in which the hinge members are shaped to form an enclosure between them when they are positioned in the folded position, the wheels being positioned in such enclosure in said folded position.

3. A foldable trolley as claimed in claim 1, in which one of the hinge members is apertured in its distal part to receive a handle member, the end of which is attached to a hinge member at the said complementary parts.

References Cited

UNITED STATES PATENTS

| | | | |
|---|---|---|---|
| 1,554,034 | 9/1925 | Richie | 280—36 |
| 3,112,042 | 11/1963 | Leshner | 280—36 |

BANJAMIN HERSH, Primary Examiner

R. R. SONG, Assistant Examiner

U.S. Cl. X.R.

280—47.24